(Model.)

J. MÜCKE.
VALVE FOR WATER SUPPLY PIPES.

No. 245,205. Patented Aug. 2, 1881.

Section y y.

Witnesses:
James F. Tobin.
H. L. Fulenwider.

Inventor:
Johann Mücke
by his Attorneys
Howson and Son

UNITED STATES PATENT OFFICE.

JOHANN MÜCKE, OF BRESLAU, GERMANY.

VALVE FOR WATER-SUPPLY PIPES.

SPECIFICATION forming part of Letters Patent No. 245,205, dated August 2, 1881.

Application filed March 12, 1881. (Model.) Patented in Germany November 10, 1878.

*To all whom it may concern:*

Be it known that I, JOHANN MÜCKE, a subject of the King of Prussia, and residing in Breslau, Germany, have invented certain Improvements in Valves for Water-Supply Pipes, of which the following is a specification.

My invention relates to improvements in valves for shutting off the water in pipes without producing the slightest shock in the latter, thus avoiding the bursting of pipes.

Figure 1:
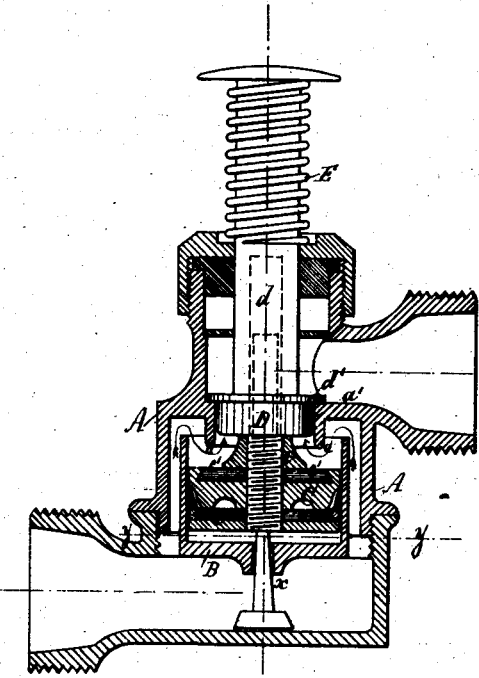
Figure 2:
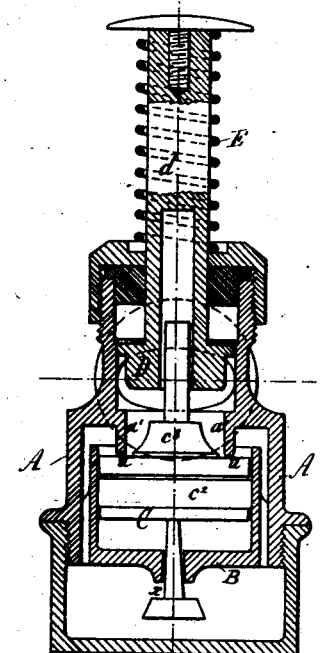
Figure 3:
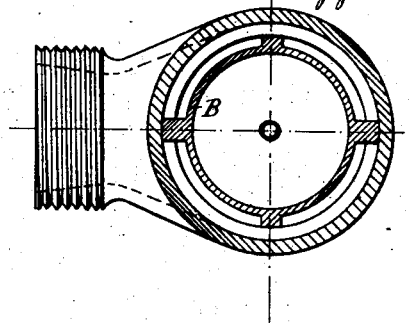

In the accompanying drawings, Figure 1 is a vertical section of the valve with rod or stem depressed; Fig. 2, a transverse section with the parts in the closed position; Fig. 3, a sectional plan on the line $yy$, Fig. 1; and Fig. 4, a section showing the valve open.

The valve consists, in its essential parts, of a casing, A, a cylinder, B, and the pistons C and D. In the lower part of the casing is the cylinder, in which the piston C, provided with leather packing $c^2$, fits snugly. The piston D is guided in the upper part of the casing and stuffing-box, and when not operated upon is always kept in its highest position by the action of the spiral spring E, placed on the piston rod or stem $d$, between the head of the latter and the gland of the stuffing-box. The piston C constitutes the valve, performing the shutting off of the water by the intimate contact of its upper leather disk, $c'$, with the face of the downward-projecting ring $a$, whereas the piston D serves only for putting the valve into operation, acting in the manner described hereinafter.

Figure 4:
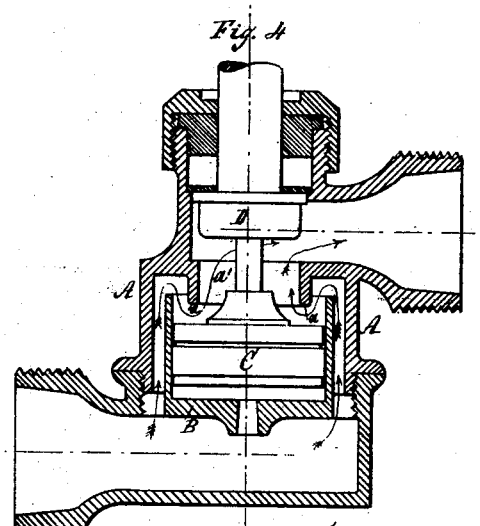

In order to open the valve, Figs. 1 and 2, the piston D is depressed by pressing upon the head of its rod or stem $d$ with the hand. In performing this motion the cylinder part of the piston enters first the opening or seat $a'$ of the valve-casing A, and then acts upon the nut $c^3$ of the piston-valve C, thus moving the upper face of the latter the requisite distance away from the edge of the projecting ring $a$. In this position (Fig. 1) of the piston C the flow of water through the valve is not yet established, the cylindrical part of the piston D being still in the opening $a'$, which it fits closely; but the passage will be opened as soon as the pressure on the stem $d$ is removed, as the latter will immediately be raised by the pressure of the spring E, in connection with the pressure of water in the pipe. The water can then flow through the valve, as shown in Fig. 4, until the piston-valve C again closes the passage, which takes place automatically as follows: At the bottom of the cylinder B is adapted a little valve, $x$, between the spindle of which and the hole in the said bottom an annular opening is left, in order to allow the water to enter the lower part of the cylinder B. The said valve being open while the piston D is being pressed down as the water flows through the valve, water will also enter through the little valve $x$ into the cylinder B, Figs. 1, 2, and 3, beneath the piston C, which will be raised, on account of the excess of pressure on the lower face of the said piston, and since the valve $x$ is attached to the piston C, the said valve will gradually shut off the passage of the water through the opening.

In order to retard the raising of the piston-valve C, as the quantity of water passing through the valve depends on the time during which the said piston is being raised to press against its seat $a'$, the edge of the projecting ring forming the seat of the valve C is made so as to dip two millimeters into the cylinder B, so that the water in its passage through the valve is forced to exert counter-pressure on the piston C.

The spindle of the valve $x$, which is attached to the valve C, is made conical, in order to decrease the size of the above-mentioned opening, and consequently the quantity of water admitted to the lower portion of the cylinder B, in proportion to the ascending motion of the piston-valve C, thereby assisting the counter-pressure on the upper face of the latter to retard the cutting off of the water-flow.

To prevent the piston D from being pressed down too far, it is provided with a projecting ring, $d'$, forming a stop against the face of the seat $a'$. The valve thus shuts off the fluid without producing the least shock in the piping, since it closes gradually. The bursting of pipes will thus be avoided.

This valve is especially adapted for water-closets, the piston D of the valve in this case being attached to the swinging end of the hinged top of the pan, so that in using the closet the piston-valve C will be depressed by the oscillating seat, and consequently while using the closet the valve is closed; but immediately on the release of the pan-seat the valve will be opened and allow the proper quantity of water to pass through necessary to clean the pan. The seat of the pan is arranged to oscillate within a range of fifteen millimeters, and returned to its upper position by a spring.

This valve may also be employed in hydrants with the same advantages.

I claim as my invention—

1. The combination of the casing having valve-seats $a$ and $a'$, and the piston D, its rod and spring, with the piston-valve C, and cylinder B, having a water-inlet below the piston-valve, all substantially as set forth.

2. The combination of a valve-seat, $a$, and piston-valve C, carrying a tapering valve, $x$, with a cylinder, B, having an inlet-opening through which said valve $x$ passes, substantially as described.

In testimony whereof I have signed my name to this specification in the presence of two subscribing witnesses.

JOHANN MÜCKE.

Witnesses:
O. R. SCHMIDT,
PAUL WEIGEL.